United States Patent
Gerecht

(10) Patent No.: US 7,047,020 B2
(45) Date of Patent: May 16, 2006

(54) ASSISTANCE TECHNIQUES FOR SUBSCRIBER UNITS HAVING POSITIONING CAPABILITIES

(75) Inventor: Douglas A. Gerecht, Golden, CO (US)

(73) Assignee: Qualcomm Inc., San Diego, CA (US)

( * ) Notice: Subject to any disclaimer, the term of this patent is extended or adjusted under 35 U.S.C. 154(b) by 206 days.

(21) Appl. No.: 10/705,798

(22) Filed: Nov. 10, 2003

(65) Prior Publication Data

US 2005/0014512 A1    Jan. 20, 2005

Related U.S. Application Data

(60) Provisional application No. 60/488,014, filed on Jul. 16, 2003.

(51) Int. Cl.
*H04Q 7/20*    (2006.01)
(52) U.S. Cl. ............... 455/456.1; 455/456.3; 455/456.5
(58) Field of Classification Search ............ 455/456.1, 455/456.2, 456.3, 456.6, 457, 422.1, 427, 455/404.02, 456.5; 342/357.01, 357.12, 342/357.09
See application file for complete search history.

(56) References Cited

U.S. PATENT DOCUMENTS

| | | | |
|---|---|---|---|
| 6,415,155 B1 * | 7/2002 | Koshima et al. | 455/456.1 |
| 6,741,863 B1 * | 5/2004 | Chiang et al. | 455/456.1 |
| 6,785,321 B1 * | 8/2004 | Yang et al. | 375/137 |
| 2003/0148771 A1 * | 8/2003 | de Verteuil | 455/456 |
| 2003/0190920 A1 * | 10/2003 | An | 455/456.1 |
| 2004/0023634 A1 * | 2/2004 | Jeong et al. | 455/403 |
| 2004/0152471 A1 * | 8/2004 | MacDonald et al. | 455/456.1 |

FOREIGN PATENT DOCUMENTS

| | | |
|---|---|---|
| EP | 1148344 | 10/2001 |
| EP | 1233280 | 8/2002 |
| WO | 02082832 | 10/2002 |
| WO | 03024131 | 3/2003 |

* cited by examiner

*Primary Examiner*—Sonny Trinh
(74) *Attorney, Agent, or Firm*—Philip Wadsworth; Bruce W. Greenhaus; Andrea L. Mays

(57) ABSTRACT

This disclosure is directed to techniques for generating position assistance information that can be used by a subscriber unit of a wireless communication system. In accordance with this disclosure, a position determination entity (PDE), e.g., which may be coupled to one or more of the base stations, implements techniques that can improve the position assistance information, and therefore improve the ability of the subscriber unit to quickly and accurately identify its location using the positioning satellites. In particular, the PDE receives information from the subscriber unit indicative of signals detected by the subscriber unit in the wireless communication system, and then divides an area where the subscriber unit is suspected to be into a plurality of sectors. The PDE scores the sectors based on the information received from the subscriber unit, wherein a score for a respective sector indicates a likelihood that the subscriber is in the respective sector.

36 Claims, 7 Drawing Sheets

ASSISTANCE TECHNIQUES FOR SUBSCRIBER UNITS HAVING POSITIONING CAPABILITIES

RELATED APPLICATIONS

This application claims priority to U.S. Provisional Application No. 60/488,014, filed on Jul. 16, 2003.

TECHNICAL FIELD

This disclosure relates to positioning systems and, more particularly, to the computation of positioning assistance information for mobile subscriber units of a wireless communication system.

BACKGROUND

The Global Positioning System (GPS) is a satellite navigation system designed to provide position information almost anywhere in the world. GPS was developed by the Unites States Department of Defense, and currently includes a constellation of twenty-four operational satellites. Other types of satellite positioning systems include the Wide Area Augmentation System (WAAS), the Global Navigation Satellite System (GLONASS) deployed by the Russian Federation, and the Galileo system planned by the European Union.

A variety of receivers have been designed to decode the signals transmitted from the positioning satellites for the purposes of determining the position of the respective receiver on or near the Earth's surface. In order to decipher the signals and compute a final position, the receiver acquires signals from the specific satellites that are in view to the receiver, and then measures and tracks the received signals and recovers navigational data from the signals.

By accurately measuring the distance from three different satellites, the receiver can triangulate its position, e.g., solving for a latitude, longitude and altitude. The receiver measures its distance to the different satellites by measuring the time it takes for each signal to travel from the respective satellite to the receiver. Often, measurements from a fourth satellite are used to help resolve time measurement errors, e.g., errors created by the inaccuracies of timing circuits within the receiver. In some cases, signals from fewer than three satellites can be used in combination with terrestrial signals to triangulate the position of the receiver, particularly when visibility to additional satellites is limited.

GPS receivers have been implemented in subscriber units of wireless communication systems in order to allow the users of the subscriber units to exploit GPS positioning capabilities. A subscriber unit generally refers to a mobile wireless device used by an end user, such as a mobile radiotelephone.

Traditional GPS receivers can take several minutes to search and identify satellites that are in view to the receiver. Then, after identifying such satellites, the GPS receiver can compute its position. In order to accelerate the time it takes the GPS receiver in a subscriber unit of a wireless communication system to identify satellites that are in view to the receiver, GPS assistance techniques have been developed. In particular, signals detected within the wireless communication system can be used to generate a rough estimate of the location of the subscriber unit. Then, GPS assistance information can be sent to the subscriber unit in order to allow the subscriber unit to more quickly identify the satellites that are in view to its GPS receiver. In code division multiple access (CDMA) systems, for example, measurements of signals from base stations in the CDMA system are used to calculate GPS assistance information. In CDMA, the process of using measurements of base station signals to provide GPS assistance is referred to as Advanced Forward Link Trilateration (AFLT).

GPS assistance techniques can greatly accelerate the time it takes a subscriber unit to identify its location using GPS. This is particularly important when the location identification is used to help first responder services, such as the "911" first responder service, to quickly pinpoint the location of the subscriber unit so that help can be dispatched to that location. GPS assistance techniques can also improve the ability of a receiver to compute a position solution in certain locations where GPS positioning techniques might fail without the assistance, such as the interior of buildings.

SUMMARY

In one embodiment, this disclosure provides a method comprising receiving information from a subscriber unit of a wireless communication system. The information is indicative of signals detected by the subscriber unit in the wireless communication system. The method further comprises dividing an area where the subscriber unit is suspected to be into a plurality of sectors, and scoring the sectors based on the information. A score for a respective sector indicates a likelihood that the subscriber is in the respective sector, with higher scores generally indicating higher probabilities that the subscriber unit is in a sector.

In another embodiment, this disclosure provides a method comprising receiving information from a subscriber unit of a wireless communication system, the information being indicative of signals detected by the subscriber unit in the wireless communication system. The method further comprises identifying two or more probable locations of the subscriber unit based on the information, and sending position assistance information to the subscriber unit based on the two or more probable locations.

Various embodiments are directed to methods, a position determination entity (PDE) that executes the methods, and in some cases, a subscriber unit that executes various methods described herein. In some cases, the techniques described herein may be implemented as software within a PDE or subscriber unit. Accordingly, this disclosure also contemplates computer-readable media comprising computer-readable instructions that, when executed, perform one or more of the techniques described herein.

The details of one or more embodiments of this disclosure are set forth in the accompanying drawings and the description below. Other features, objects, and advantages of this disclosure will be apparent from the description and drawings, and from the claims.

DETAILED DESCRIPTION

Figure 1:
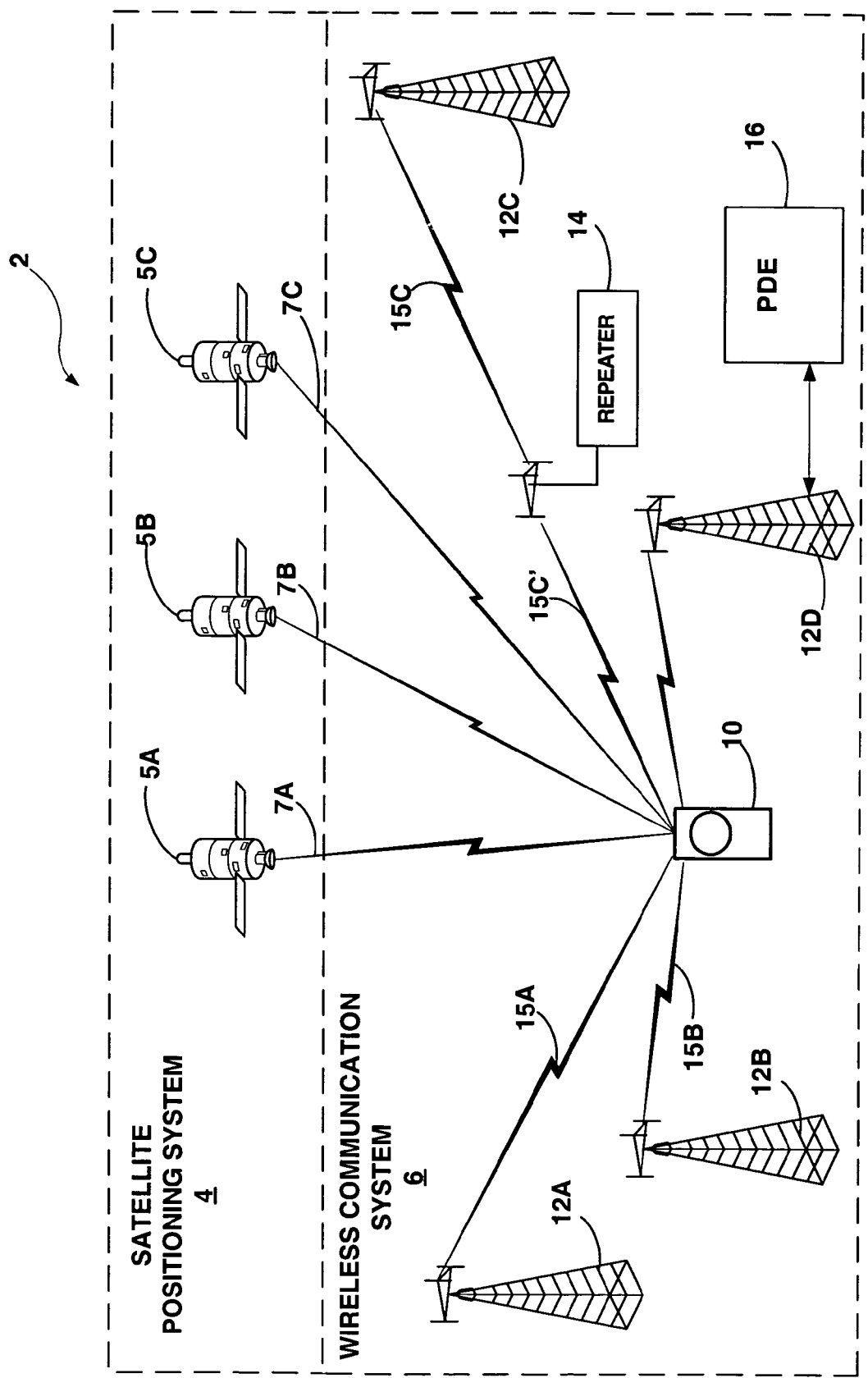
FIG. 1 is a block diagram illustrating an exemplary system according to this disclosure that includes a satellite positioning system and a wireless communication system.

In general, this disclosure is directed to techniques for generating position assistance information that can be used by a subscriber unit of a wireless communication system. The subscriber unit includes a receiver that receives signals from positioning system satellites in order to calculate its position on the surface of the earth. In addition, the subscriber unit includes a receiver that receives signals from one or more base stations of the wireless communication system.

The subscriber unit detects signals associated with base stations of the wireless communication system and sends information indicative of the detected signals to a position determination entity (PDE). The PDE may be coupled to one or more of the base stations. The PDE uses the information sent by the subscriber unit to generate position assistance information, which is returned to the subscriber unit. The subscriber unit then uses the position assistance information to accelerate the process of identifying its location using positioning satellites of a satellite positioning system.

In accordance with this disclosure, the PDE implements techniques that can improve the position assistance information, and therefore improve the ability of the subscriber unit to quickly and accurately identify its location using the positioning satellites. In particular, the PDE receives information from the subscriber unit indicative of signals detected by the subscriber unit in the wireless communication system, and then divides an area where the subscriber unit is suspected to be into a plurality of sectors. The PDE scores the sectors based on the information received from the subscriber unit. A score for a respective sector indicates a likelihood that the subscriber is in the respective sector. For example, higher scores generally indicate higher probabilities that the subscriber unit is within a sector.

If desired, the PDE may sub-divide high scoring sectors into other sectors, i.e., sub-sectors, in an iterative manner until one or more relatively small sectors are identified as likely candidates of the location of the subscriber unit. Moreover, the PDE may perform the technique of scoring the different sectors for each of a plurality of hypothetical timing errors associated with the subscriber unit. In other words, the PDE performs the scoring techniques for different possible timing errors in order to find one or more sectors that correlate with the received signals and an estimated timing error for the subscriber unit. Once one or more sectors are identified as likely candidates of the location of the subscriber unit, the PDE sends position assistance information to the subscriber unit, such as a short list of positioning satellites that should be in view to the subscriber unit. The subscriber unit can then identify its position using signals detected from the positioning satellites.

The techniques described in greater detail below can significantly improve the ability to pinpoint the location of a subscriber unit of a wireless communication system. In particular, the techniques can accelerate the time it takes a subscriber unit to identify its location using the global positioning system (GPS), which is particularly important when the position identification is used to help first responder services, such as the "911" first responder service.

The techniques can also improve the ability of a receiver to compute a position solution in locations where positioning techniques might fail without the assistance, such as the interior of buildings. Moreover, the techniques described herein can improve conventional assistance techniques, particularly in wireless communication systems that make use of repeaters to repeat signals sent from base stations. In many cases, the position assistance information sent from the PDE to the subscriber unit is based on two or more probable locations of the subscriber unit.

FIG. 1 is a block diagram illustrating an exemplary system 2 comprising a satellite positioning system 4 and a wireless communication system 6. By way of example, satellite positioning system 4 may comprise the global positioning system (GPS) developed by the Unites States Department of Defense. Alternatively, satellite positioning system 4 may comprise the Wide Area Augmentation System (WAAS), the Global Navigation Satellite System (GLONASS) deployed by the Russian Federation, the Galileo system planned by the European Union, or the like. In any case, satellite positioning system 4 includes a plurality of satellites 5A–5C (collectively satellites 5) that orbit the earth and send signals which can be received by positioning receivers on or near the earth's surface. Although three satellites 5 are illustrated in FIG. 1 for simplicity, the current GPS includes twenty-four satellites. Satellites 5 send positioning signals 7A–7C (collectively positioning signals 7), which can be used by subscriber unit of wireless communication system 6 to triangulate its position on or near the earth's surface.

In wireless communication system 6, base stations 12A–12D (collectively base stations 12) provide network access to various subscriber units 10. Although a single subscriber unit 10 is illustrated, system 6 typically supports large numbers of such units. A subscriber unit 10 generally refers to a mobile wireless device used by an end user, such as a mobile radiotelephone. Base stations 12 are generally stationary equipment that wirelessly communicate with subscriber unit 10 to provide subscriber unit 10 with access to a wired telecommunication network. For example, base stations 12 may provide an interface between the subscriber units and a public switched telephone network (PSTN) such that telephone calls can be routed to and from subscriber unit 10. Alternatively or additionally, base stations 12 may be coupled to a packet-based network for transmission of packet-based voice information or packet-based data.

Wireless communication system 6 may also include one or more repeaters 14. A repeater 14 can be installed in wireless communication system 6 in order to extend network coverage associated with one or more of the base stations, e.g. base station 12C in the example of FIG. 1. Repeater 14 generally refers to a network device that receives signals from one or more base stations 12, and retransmits substantially the same signals to the subscriber units 10. For example, repeater 14 may receive signals 15C from base station 12C, and repeat signals 15C (the repeated signal being labeled 15C') in order to extend network coverage of base station 12C. Repeaters 14 can be uni-directional, i.e., repeating signals received from either a base station 12C or subscriber unit 10, or bi-directional, i.e., repeating signals received from both base station 12C and subscriber unit 10. In some cases, repeater 14 may be wired to base station 12C, e.g., via a fiber optic link, copper wire, or the like. In other cases, repeater 14 is completely wireless, as illustrated in FIG. 1. Wireless repeaters 14 typically receive a signal, amplify the signal, and then retransmit the amplified signal to the subscriber unit 10 (or base station 12C).

Repeaters are commonly considered a cost-effective mechanism for extending or improving network coverage. In particular, the use of repeaters can effectively broaden the geographical coverage area associated with a given base station. Moreover, the cost of implementing a repeater can be significantly less than the cost of adding an additional base station. Implementing repeaters in a wireless communication system, however, raises a number of challenges and potential difficulties. In particular, repeaters can reduce the accuracy of conventional position assistance information. For this reason and other reasons, it is desirable to improve techniques of generating position assistance information in wireless communication system 6.

Positioning assistance techniques, as described herein, can accelerate the time it takes subscriber unit 10 to identify its location using satellite positioning system 4. Again, this is particularly important when the position identification is used to help first responder services, such as the "911" first responder service. In order to generate position assistance information, system 6 includes one or more position determination entities (PDE) 16. PDE 16 refers to network equipment that receives input sent from subscriber unit 10 and uses that input to generate position assistance information that is returned to subscriber unit 10. PDE 16 generally maintains a record of the topology of wireless communication system 6 as well as a record of the locations of various satellites 6 of satellite positioning system 4. PDE 16 receives signals from subscriber unit 10, e.g., via base station 12D, processes the signals to generate position assistance information, and returns the position assistance information to subscriber unit, e.g., via base station 12D.

In accordance with this disclosure, PDE 16 implements techniques that can improve the accuracy of position assistance information, and therefore improve the ability of subscriber unit 10 to quickly and accurately identify its location using positioning satellites 5 of satellite positioning system 5. In particular, PDE 16 receives information from subscriber unit 10 indicative of signals 15A–15D (collectively signals 15) detected by subscriber unit 10 in wireless communication system 6. PDE 16 then divides an area where the subscriber unit 10 is suspected to be into a plurality of sectors. For example, PDE 16 may assume that subscriber unit 10 is in the general vicinity of base station 12D, e.g., wherein base station 12D is the current base station providing service to subscriber unit 10.

After dividing an area where subscriber unit 10 is suspected to be into a plurality of sectors, PDE 16 scores the sectors based on the information received from subscriber unit 10 indicative of detected signals 15. A score for a particular sector indicates a likelihood that subscriber unit 10 is in that particular sector. If desired, PDE 16 may further sub-divide high scoring sectors into other sectors, i.e., sub-sectors, in an iterative manner until one or more relatively small sectors are identified as likely candidates of the location of subscriber unit 10. Moreover, PDE 16 may perform the technique of scoring the different sectors for each of a plurality of hypothetical timing errors associated with subscriber unit 10. In other words, PDE 16 performs the scoring techniques for different possible timing errors of subscriber unit 10 in order to find one or more sectors that correlate with the received signals identified by subscriber unit 10 and an estimated timing error of subscriber unit 10. The timing error refers to a time differential of an internal clock of subscriber unit 10 relative to the system time of system 6, which may also correspond to system time of system 4. In any case, once one or more sectors are identified as likely candidates of the location of subscriber unit 10, PDE 16 sends position assistance information to subscriber unit 10, such as a short list of positioning satellites 6 that should be in view to subscriber unit 10. Subscriber unit 10 can then identify its position using signals 7 detected from positioning satellites 6.

Figure 2:
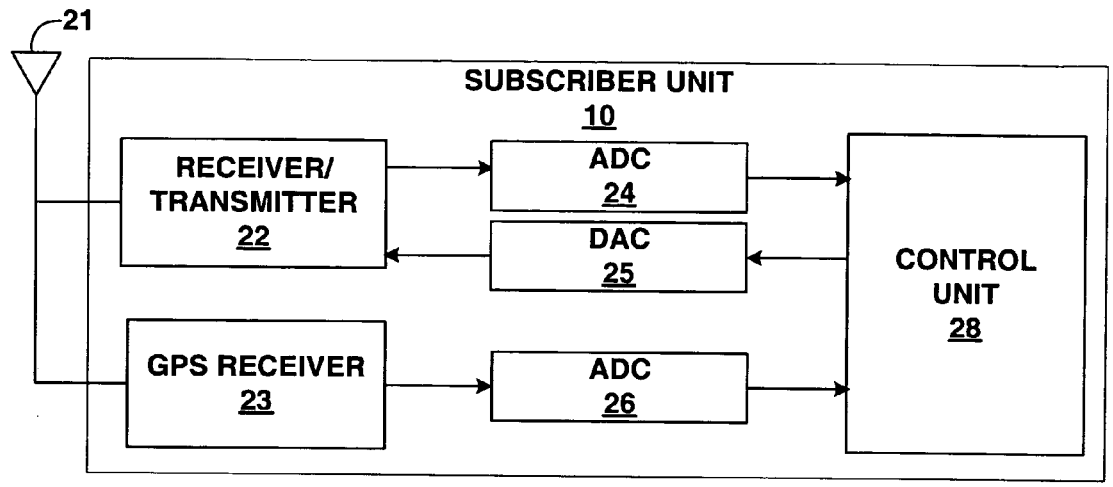
FIG. 2 is a block diagram of a subscriber unit according to an embodiment of this disclosure.

FIG. 2 is a block diagram of subscriber unit 10 according to an embodiment of this disclosure. Subscriber unit 10 typically comprises a mobile radiotelephone. However, subscriber unit 10 may also be implemented in any of a wide variety of other portable computing devices such as a desktop or portable computer, a personal digital assistant (PDA), an interactive television, a wireless data terminal, a wireless data collection device, or any other wireless device. The illustrated components of subscriber unit 10 are specifically those components used in accordance with the teaching of this disclosure. Numerous other components exist for other functions, such as signal encoding and demodulation. For simplicity, however, the additional components are not illustrated.

Subscriber unit 10 includes an antenna 21 coupled to a receiver/transmitter 22 for receiving signals 15 from base stations 12 or a repeater 14. Antenna 21 of subscriber unit 10 is also coupled to a GPS receiver 23 for receiving positioning signals 7 from satellites 5 of satellite positioning system 4, e.g., the GPS system, or the like. Alternatively, separate antennas (not shown) may be used for receiving positioning signals 7 and base station signals 15.

Receiver/transmitter 22 and GPS receiver 23 may be integrated as a single component, or may comprise separate components as illustrated in FIG. 2. An analog-to-digital converter (ADC) 24 converts signals received by receiver/transmitter 22 to digital signals for subsequent processing by control unit 28. Similarly, analog-to-digital converter (ADC) 26 converts signals received by GPS receiver 23 to digital signals for subsequent processing by control unit 28. ADC's 24 and 26 may be separate components or a common component, i.e., a signal ADC used for both receivers. Following signal processing in control unit 28, signals sent from control unit 28 are converted to analog signals by digital-to-analog converter (DAC) 25 for transmission by receiver/transmitter 24.

In accordance with this disclosure, control unit 28 examines incoming signals received by receiver/transmitter 22 in order to identify signals 15 (FIG. 1) received from various neighboring base stations 12. Control unit 28 may comprise a digital signal processor (DSP) executing software modules, a programmable microprocessor, or discrete hardware components. Also, control unit 28 may be implemented in any combination of hardware, software, firmware, one or more programmable microprocessors, digital signal processors, or the like. If techniques are implemented by subscriber unit 10 in software, a memory or other computer-readable medium (not shown) may be coupled to control unit 28 in order to store the software instructions loaded into control unit 28 for execution.

In any case, control unit 28 detects signals 15 and then generates information indicative of detected signals 15 associated with base stations 12. For example, control unit 28 may scan received signals for the presence of signals, e.g., pilot symbols, at defined phase offsets relative to system time. Control unit 28 then forwards generated information indicative of detected signals 15 associated with neighboring base stations 12 to receiver/transmitter 22 for transmission to PDE 16, e.g., through base station 12D (FIG. 1). PDE 16 uses the information detected by subscriber unit 10 in generating position assistance information in accordance with this disclosure.

Signals 15 associated with base stations 12 may come directly from base stations 12 or alternatively, one or more of signals 15 may come from repeater 14, e.g., associated with base stations 12C. Again, in detecting signals 15, control unit 28 may detect offsets from system time. Offsets from system time are commonly used in spread spectrum systems to distinguish different base stations 12. Alternatively, control unit 28 may identify network identification (ID) codes from received signals, e.g., obtained from overhead channels of respective signals 15. In one example, where wireless communication system 6 comprises a CDMA system, control unit 28 examines received signals 15 and searches for pilot symbols in possible pseudo-random noise (PN) offsets defined by the CDMA system. If pilot symbols are detected at a particular PN offset, control unit 28 identifies the presence of pilot symbols, and forwards information identifying that particular PN offset to PDE 16. In this manner, control unit 28 can be used to identify base stations 12 that are within relatively close proximity to subscriber unit 15.

Figure 3:
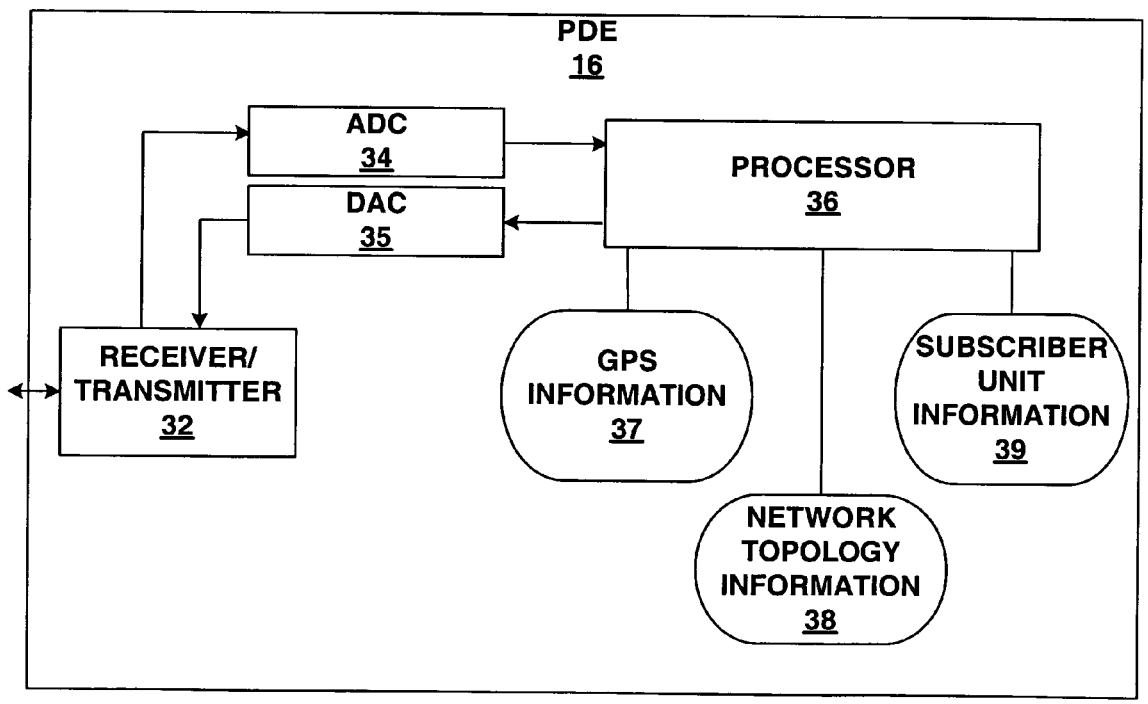
FIG. 3 is a block diagram of a position determination entity (PDE) according to an embodiment of this disclosure.

FIG. 3 is a block diagram of a position determination entity (PDE) 16 according to an embodiment of this disclosure. PDE 16 uses the information received from subscriber unit 10 to generate position assistance information in accordance with this disclosure. In particular, as outlined in greater detail below, PDE 16 implements an algorithm that divides an area where subscriber unit 10 is suspected to be into a plurality of sectors, and scores the sectors based on the information received from subscriber unit 10, wherein a score for a respective sector indicates a likelihood that subscriber unit 10 is in the respective sector.

Also, PDE 16 may sub-divide high scoring sectors into other sectors, i.e., sub-sectors, in an iterative manner until one or more relatively small sectors are identified as likely candidates of the location of subscriber unit 10. In one embodiment, PDE 16 performs the technique of scoring the different sectors for each of a plurality of hypothetical timing errors associated with subscriber unit 16. Upon identifying one or more sectors that are likely to include subscriber unit 10, PDE 16 generates position assistance information including, for example, a list of satellites 5 that are likely to be in view to subscriber unit 10. PDE 16 sends the position assistance information to subscriber unit 10 so that subscriber unit 10 can triangulate its position very quickly.

In the illustrated example of FIG. 3, PDE 16 includes a receiver/transmitter 32 to receive information from subscriber unit 10, e.g., via base station 12D. ADC 24 converts received signals to digital signals, and forwards the digital signals to processor 36, which performs various techniques described herein. Processor 36 accesses information that is stored for purposes of facilitating generation of position assistance information. For example, processor 36 accesses GPS information 37, network topology information 38, and subscriber unit information 39. Subscriber unit information 39 refers to the information identified and sent from subscriber unit 10 as outlined above. Network topology information 38 includes an almanac of base stations in proximity to subscriber unit 10, and may be received from subscriber unit 10 or maintained within PDE 16 as a general mapping of the topology of wireless communication network 6. In addition, network topology information 38 may also include mappings of other devices in network 6, e.g., repeaters or the like. In other words, the mapping of the topology of wireless communication network 6 may identify base stations as well as repeaters or other devices in network 6. GPS information 36 refers to information indicative of the location of the various satellites 5 of satellite positioning system 4, and may be measured by PDE 16, e.g., by receiving signals 7, or can be stored and updated, e.g., by some external source.

Processor 36 may comprise a digital signal processor (DSP) executing software modules, a programmable microprocessor, or discrete hardware components. Also, processor 36 may be implemented in any combination of hardware, software, firmware, one or more programmable microprocessors, digital signal processors, or the like. If techniques are implemented by PDE 16 in software, a memory or other computer-readable medium (not shown) may be coupled to processor 36 in order to store the software instructions loaded into processor 36 for execution within PDE 16.

In accordance with this disclosure, PDE 16 implements techniques that can improve the accuracy of position assistance information, and therefore improve the ability of subscriber unit 10 to quickly and accurately identify its location using positioning satellites 5. PDE 16 receives information from subscriber unit 10 indicative of signals 15 detected by subscriber unit 10 in wireless communication system 6. Processor 36 stores the received information from subscriber unit 10 as subscriber unit information 39. Processor 36 of PDE 16 accesses network topology information 38 defining the area where the subscriber unit 10 is suspected to be, and divides the area into a plurality of sectors. For example, the area where the subscriber unit 10 is suspected to be may correspond to the general area surrounding base station 12C, which corresponds to the current base station servicing subscriber unit 10.

Processor 36 scores each of the sectors divided from the area where subscriber unit 10 is suspected to be. Again, a score for a respective sector indicates a likelihood that the subscriber is in the respective sector. The scoring may be based on a variety of factors, as outlined in greater detail below. In general, processor 36 scores the sectors based on correlation with subscriber unit information 39. If desired, processor 36 may then sub-divide high scoring sectors into other sectors, i.e., sub-sectors, in an iterative manner until one or more relatively small sectors are identified as likely candidates of the location of subscriber unit 10.

Processor 36 generally performs the technique of scoring the different sectors for each of a plurality of hypothetical timing errors associated with subscriber unit 10. In other words, processor 36 performs the scoring techniques for different possible timing errors in order to find one or more sectors that correlate with signals 15 detected by subscriber unit 10 and an estimated timing error for subscriber unit 10. The timing error refers to a time differential of an internal clock of subscriber unit 10 relative to the system time of system 6, which may also correspond to system time of system 4. In accordance with this disclosure, processor 36 estimates a value of the timing error and calculates scores for the different sectors based on the estimated timing error. Higher scores generally indicate higher probabilities that subscriber unit is in a sector. Processor 36 then estimates other values of the timing error, in an iterative manner, and calculates scores for the different sectors based on the other estimated timing errors.

In order to estimate the timing error, processor 36 may calculate the timing error for the current serving base station of subscriber unit 10. The timing error measured for the current serving base station should provide a relatively accurate estimate of the timing error, or at least a relatively close starting point. Subsequent estimates of the timing error may be selected as timing errors larger and smaller than the timing error measured for the current serving base station.

Subsequent estimates of the timing error may also be calculated from other base stations in the vicinity of the current serving base station.

Once one or more sectors are identified as likely candidates of the location of the subscriber unit for one of the estimated timing errors, processor 36 causes PDE 16 to send position assistance information to subscriber unit 10, such as a short list of positioning satellites 5 that should be in view to subscriber unit 10. In particular, processor 36 forwards the position assistance information to DAC 35 which converts the digital signals to analog signals. Modulation or encoding of the positioning assistance information may also be performed prior to the digital to analog conversion. Receiver/transmitter 32 then transmits the position assistance information to subscriber unit 10, e.g., via base station 12C. For example, receiver/transmitter 32 can encode the position assistance information on a carrier signal and may also use techniques such as CDMA, TDMA, FDMA, or another wireless communication technique. Upon receiving the position assistance information, subscriber unit 10 can identify its position very quickly.

The techniques described herein can significantly improve the ability to pinpoint the location of a subscriber unit 10 of a wireless communication system 6. The techniques can also improve the ability of a receiver to compute a position solution in locations where positioning techniques might fail without the assistance, such as the interior of buildings. Moreover, the techniques described herein can improve conventional assistance techniques, particularly in wireless communication systems that make use of repeaters to repeat signals sent from base stations. In many cases, the position assistance information sent from PDE 16 to subscriber unit 10 is based on the two or more probable locations, i.e., two or more sectors identified by PDE 16 as probable candidates of the location of subscriber unit 10.

The scoring system implemented by processor 36 of PDE to score the different sectors where subscriber unit 10 is suspected to be may be based on numerous factors. In general, scoring the sectors includes increasing a given score of a given sector when one or more detected signals sent from subscriber unit 10 correlate with one or more base stations in proximity to the given sector. In other words, if the signals expected from the one or more base stations in proximity to the given sector match the detected signals, a high score should be generated. Scores may be compared on a relative basis to identify high scores, or may be compared to one or more thresholds in order to identify which scores are high enough to indicate probable locations of subscriber unit 10. In the later case, the thresholds may be programmed into PDE 16 for comparison to calculated scores.

In some cases, the scoring of sectors may include a process that takes the presence of repeaters into account. For example, scoring the sectors may include modifying a given score of a given sector when a repeater is associated with that sector, e.g., by increasing or decreasing the score when a repeater is associated with the sector. Alternatively, the process may include identifying a first subset of the sectors that have high scores, and identifying a second subset of the sectors by removing one or more sectors from the first subset based on a determination that the one or more sectors are a location of a repeater in the wireless communication system. In still other cases, the scores of other sectors may be increased if a different sector is thought to contain a repeater.

Figure 5:
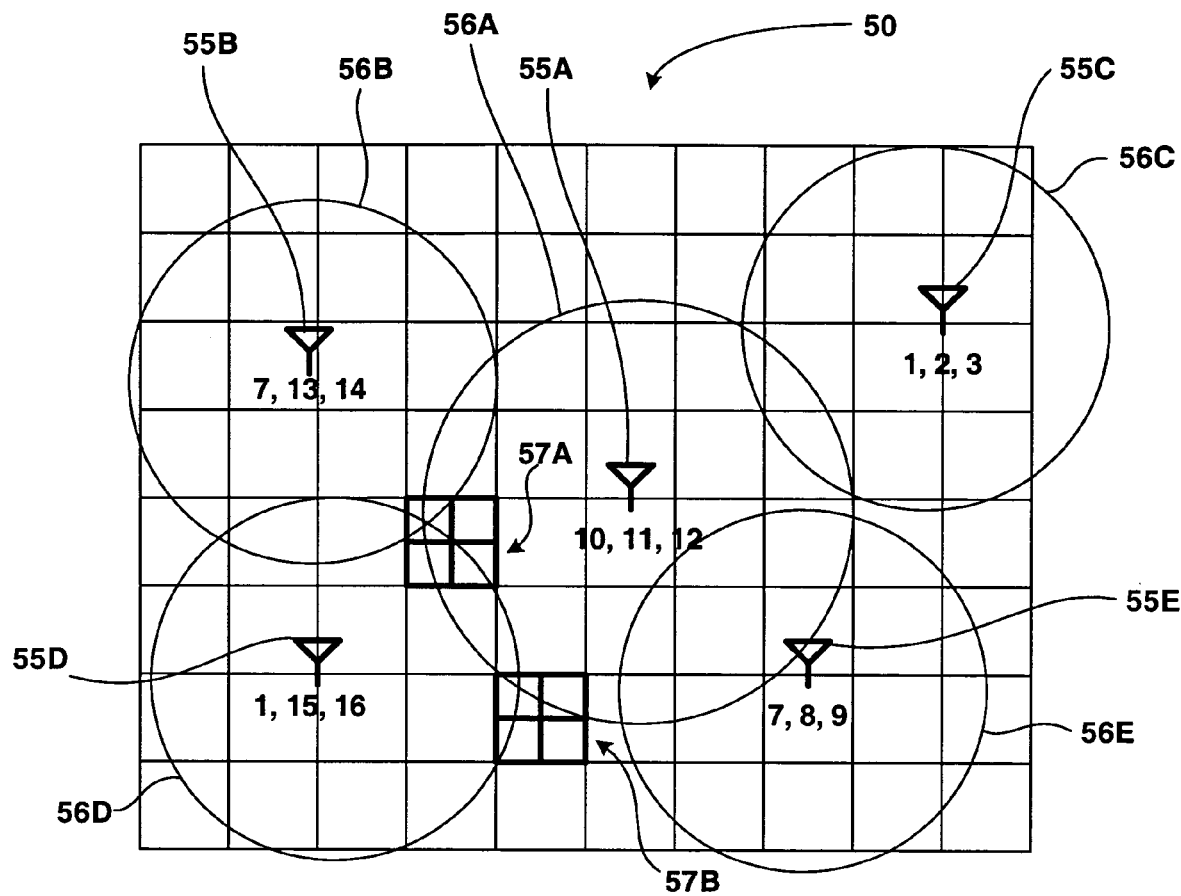
FIG. 5 is a conceptual diagram illustrating the execution of various techniques described herein
Figure 7:
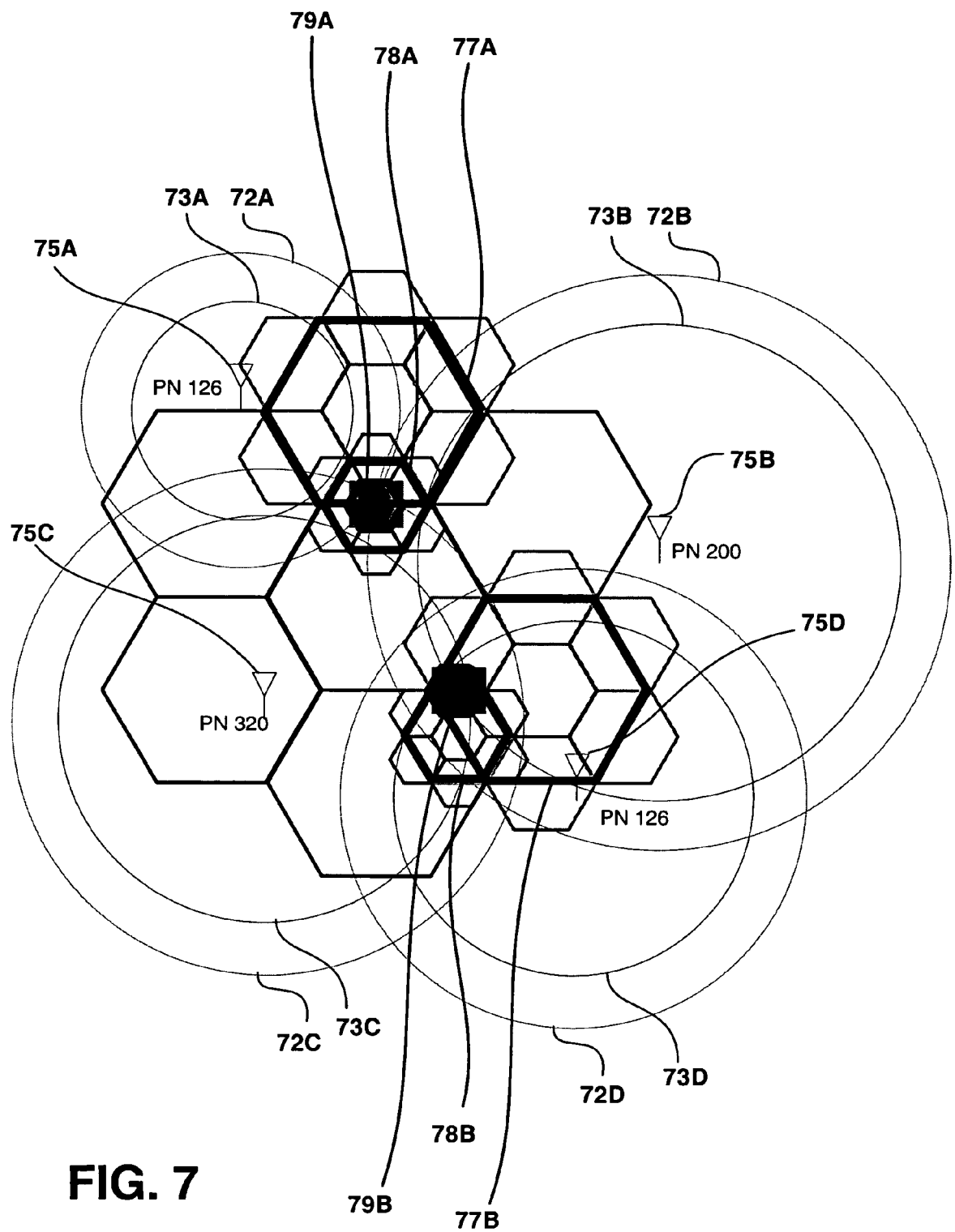
FIG. 7 is another conceptual diagram illustrating the execution of various techniques described herein.

Conceptually, following the selection of timing errors associated with subscriber unit 10, the signals of the base stations 12 can be represented as circles which pass through various sectors. FIG. 5 illustrates one example of conceptual circles associated with the signals 56A–56E of base stations 55A–55E at a given timing error, and FIG. 7 illustrates an example of conceptual circles 72A–72D, 73A–73D associated with the signals of base stations 75 for two different estimated timing errors. FIGS. 5 and 7 are discussed in greater detail below.

In accordance with this disclosure, the scoring of a sector may be affected if circles pass through a given sector, i.e., increased if a circle passes through the sector. Also, the scoring may be affected if a circle merely contains a sector. In some cases, an indicia or watermark may be modulated in a base station signal if that signal had passed through a repeater. Detection of a repeater indicia may also be used to effect the scoring. Also, statistical calculations, such as a least squares residual calculation of different base station signals at a given sector may be used in the process. In some embodiments, repeaters can be treated as a signal source by the scoring technique, i.e., treated the same or similar to a base station during the scoring.

Figure 4:
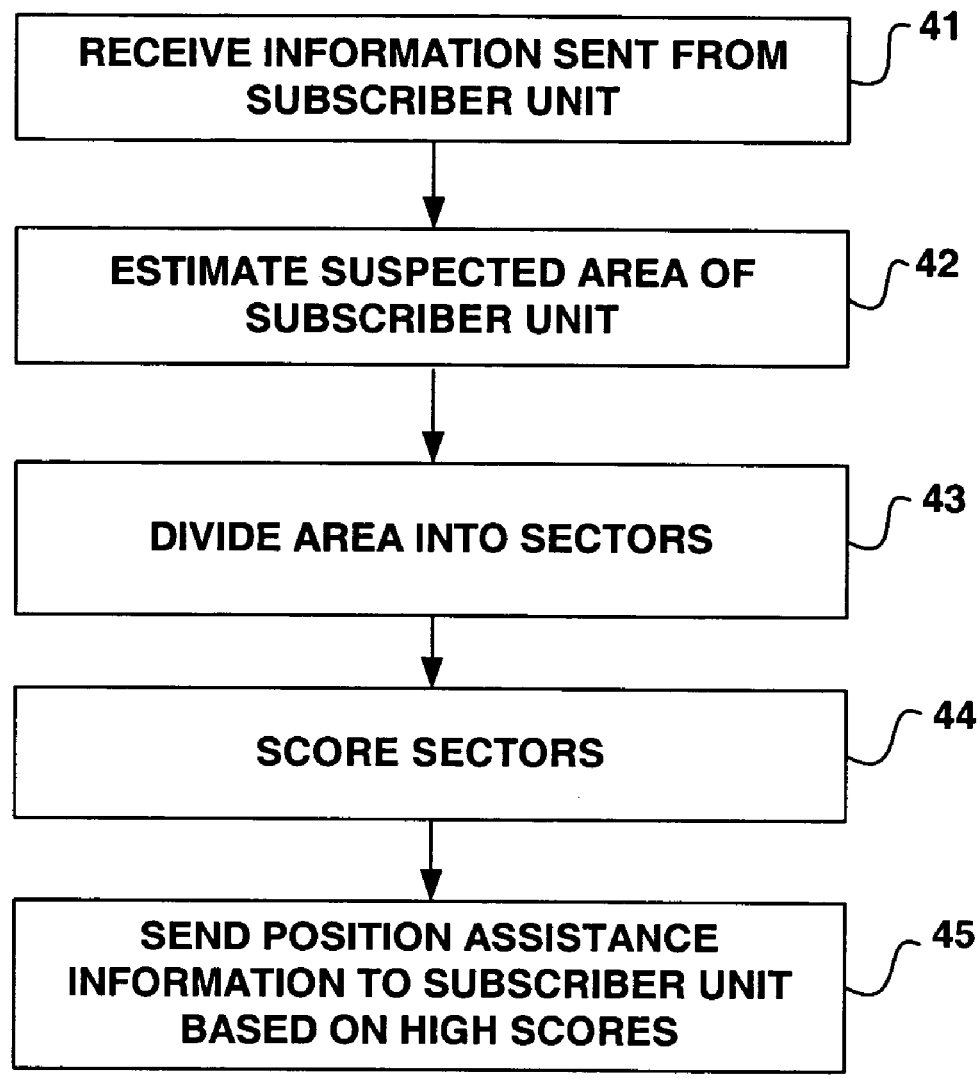
FIG. 4 is a flow diagram illustrating a technique according to an embodiment of this disclosure.

FIG. 4 is a flow diagram illustrating a technique according to an embodiment of this disclosure. In describing FIG. 4, reference will be made to FIG. 5. As shown, in FIG. 4, PDE 16 receives information sent from subscriber unit 10 indicative of base station signals 56A–56E detected by subscriber unit 10 (41). Base station signals 56 detected by subscriber unit 10 from base stations 55A–55E may correspond to one or more of base stations 12 (FIG. 1). Exemplary PN offsets of each of base stations 55 are labeled below the respective base stations illustrated in FIG. 5.

PDE 16 estimates a suspected area 50 of subscriber unit (42), and divides the suspected area into sectors (43). In FIG. 5, the sectors are illustrated as a plurality of square-shaped regions that form a grid. Alternatively, the sectors may assume any geometrical shape. Circular shaped sectors may be particularly useful from a computational standpoint. For example, it may be computationally simpler to use sectors that are overlapping circles. In that case, simple comparisons of the circle radius plus or minus the sector radius to the distance between the signal source and the sector center may be used.

The area 50 where the subscriber unit 10 is suspected to be may be centered about the current or last known serving base station 55 associated with subscriber unit 10, e.g., base station 55A which may correspond to base station 12D (FIG. 1). The size of the area may vary based on the collection of base station signals 56 detected by subscriber unit 10 from base stations 55A–55E. Also, the selected area may also be affected by the length of time since subscriber unit 10 was known to be communicating with the serving base station. The size of the area should be large enough to encompass transmitters of all signals 56 found in the set of measurements of subscriber unit 10, and should encompass all regions where it is possible to communicate with the serving base station.

PDE 16 divides the suspected area into sectors (43) and scores the sectors (44). For example, sectors 57A and 57B may receive high scores based on correlation with measured base station signals 56. After identifying sectors 57A and 57B, PDE 16 may send position assistance information to subscriber unit 10 based on the high scores (45). For example, the position assistance information may be related to broad areas that cover both of sectors 57A and 57B, or may be related to the plurality of smaller areas associated with each of sectors 57A and 57B.

If desired, PDE may further sub-divide high scoring sectors 57A and 57B into smaller sectors, i.e., sub-sectors, as illustrated in FIG. 5. The scoring process may then be performed for the smaller sectors. In the example illustrated in FIG. 5, the upper-left-hand sub-sectors of each of sectors 57A and 57B may receive high scores relative to the other sub-sectors because of correlation between expected and detected signals. In that case, PDE 16 may send position assistance information to subscriber unit 10 based on the high scoring sub-sectors, i.e., the upper-left-hand sub-sectors of each of sectors 57A, 57B. Further sub-dividing into even smaller sectors could also be performed, e.g., dividing sub-sectors into sub-sub-sectors, and so forth. Notably, the position assistance information may be based on identification of two or more potential locations of the subscriber unit, i.e., two or more different sectors. For example, the position assistance information may be related to broad area that coverers all of the high scoring sectors, sub-sectors, sub-sub-sectors, or the like, or may be related to the plurality of smaller areas associated with each of the sectors, sub-sectors or sub-sub-sectors.

Put another way, area 50 is divided into a coarse grid, and each sector of the grid is assigned a score based on the likelihood that the solution lies within that sector. Sectors with a high score are themselves sub-divided into a finer grid, and each sub-sector is assigned a score in the same manner as the first iteration. The process may continue until a reasonably small sector-size is reached. Moreover, the process can be repeated for a plurality of different timing errors associated with the subscriber unit. If desired, once one or more sectors have been identified, a least squares algorithm may be used to pinpoint the location of the subscriber unit within the sector.

For example, in a CDMA system, assuming that a PN phase measurement ($t_n$) is line of sight (LOS), then the subscriber unit's distance ($r_n$) from a given base station is given by:

$$r_n = (t_n + t_{err})c$$

where $t_{err}$ is the timing error, given by the difference between actual time and the time known to the subscriber unit 10, and c is the speed of light. The term $t_{err}$ is approximately the same for all measurements in a given set. Sample values of $t_{err}$ can be used starting at $-\max(t_n)$, incrementing $t_{err}$ by half the grid size, e.g., half the size of a sector. A circle is drawn around each possible signal source of radius $r_n$. Each sector can be scored based on the various criteria described herein. Those sectors with a high score can be subdivided into smaller sectors and the process repeated for those smaller sectors.

The subdividing may continue until there is either a clear winner, i.e. a sector having a higher relative score than other sectors, the sector size is sufficiently small, or there is a significant degradation in sector scores due to subdividing. If there is no clear winner, then the algorithm may result in a set of sectors with scores indicating their relative likelihood of being the correct solution. The PN's and base stations that contribute LOS signals to a particular sector's score can then be solved using a least squares fit to identify a specific position within the given sector.

Referring again to FIG. 5, signals 55 define circles of radius $r_n$ for a set of 3 $t_n$ measurements. In this example, there is a measurement by a subscriber unit 10 of PN's 1, 7, and 10. Even though there are multiple candidate signal sources for PN's 1 and 7, a convergence stands out in the subdivided sector 57A in the upper-left-hand sub-sector because a number of circles 55 pass through a common area. Accordingly, PDE 16 can generate position assistance information, e.g., including satellites 5 that should be within view to a subscriber unit in the upper-left-hand sub-sector of sector 57A. PDE 16 sends this position assistance information to subscriber unit 10 for use by subscriber unit in triangulating its position. The upper-left-hand sub-sector of sector 57B may also be used in generating the position assistance information, if its score indicates a significant probability of the presence of subscriber unit 10.

Figure 6:
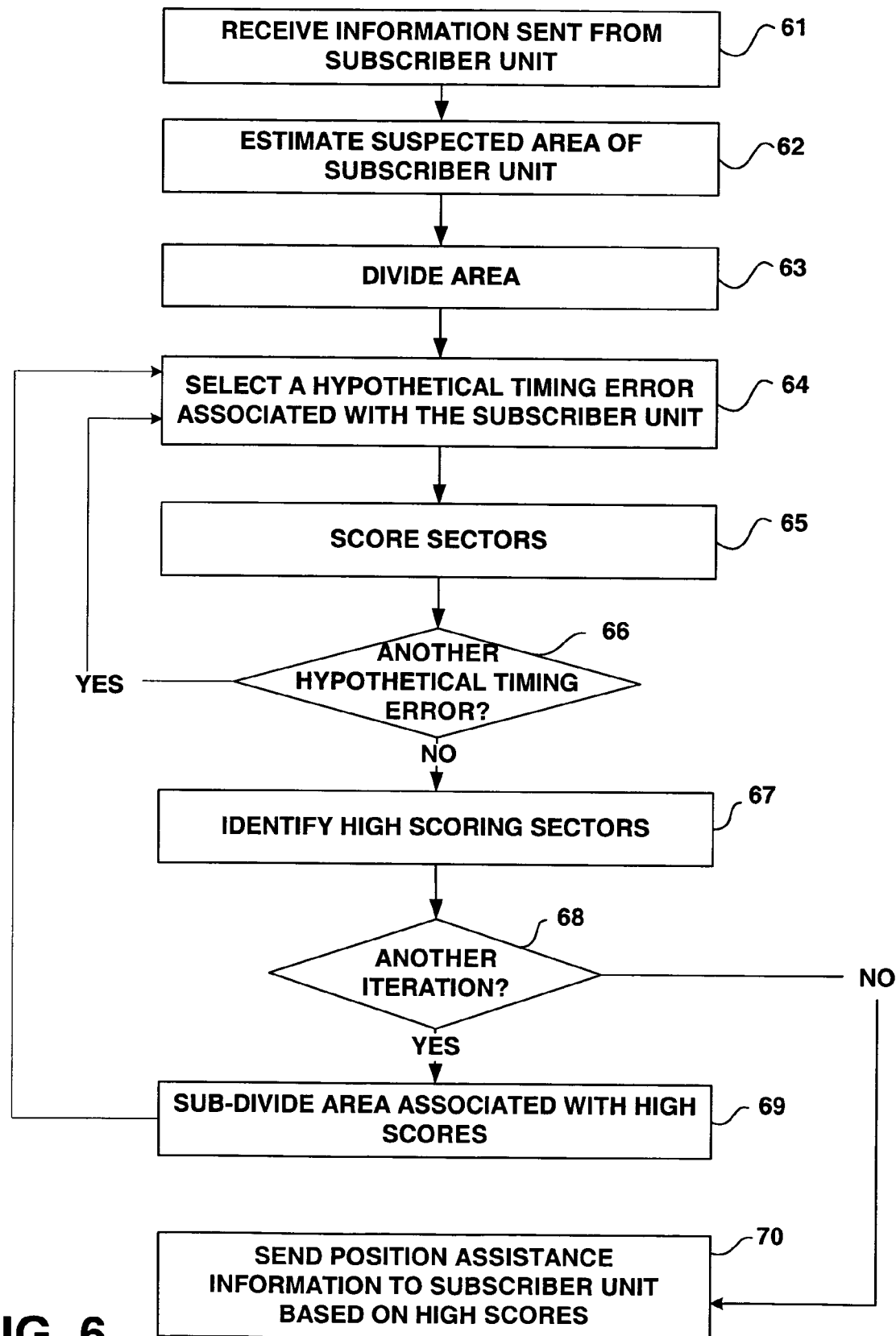
FIG. 6 is another flow diagram illustrating a technique according to an embodiment of this disclosure.

FIG. 6 is another flow diagram illustrating a technique according to an embodiment of this disclosure. As shown in FIG. 6, PDE 16 receives information sent from subscriber unit 10 (61), and estimates a suspected area of subscriber unit 10 (62). PDE 16 then divides the area into a plurality of sectors (63).

PDE 16 selects a hypothetical timing error associated with the subscriber unit (64). In order to select a hypothetical timing error, PDE 16 may calculate the timing error for the current serving base station of subscriber unit 10. The timing error measured for the current serving base station should provide a relatively accurate estimate of the timing error, or at least a relatively close starting point. Subsequent estimates of the timing error may be selected as timing errors larger and smaller than the timing error measured for the current serving base station. Subsequent estimates of the timing error may also be calculated from other base stations in the vicinity of the current serving base station.

PDE 16 then scores each of the sectors in the area (65). PDE 16 then determines if there is another potential timing error that should be considered (66). If so, PDE 16 selects another hypothetical timing error hypothetical timing error associated with the subscriber unit (64) and repeats step 65 for the other hypothetical timing error.

PDE 16 then identifies high scoring sectors (67). If another iteration of division of the sectors is desirable (yes branch of 68), PDE 16 sub-divides the area associated with high scores (69) and the process of steps 64–69 repeats for the sub-sectors. In other words, PDE 16 divides high scoring sectors into smaller sectors, i.e., sub-sectors, scores the smaller sectors (65), and identifies high scoring sectors (67). The steps 64–69 may repeat until there is a clear winner, i.e., a sector having a much higher score than other sectors, the sector size becomes sufficiently small, or there is a significant degradation in sector scores due to subdividing. At that point, another iteration is unnecessary (no branch of 68).

Moreover, at this point, one or more sectors should be identified as likely candidate sectors for the location of subscriber unit 10. If desired, statistical calculations may be used to further pinpoint the likely location of subscriber unit 10 within each likely candidate sector. Once PDE 16 determines that additional iterations of division of the sectors is not needed (no branch of 68), PDE 16 sends position assistance information to subscriber unit 10 based on the high scores it generated (70).

FIG. 7 is another conceptual diagram illustrating the execution of various techniques described herein. In particular FIG. 7 illustrates conceptual circles 72A–72D, 73A–73D associated with the signals of base stations 75A–75D at two different estimated timing errors. Base stations 75 may correspond to base stations 12 (FIG. 1). As conceptually illustrated in FIG. 7, the sectors have hexagon shapes. The PN offset for each of base stations 75 is labeled next to the respective base station.

PDE 16 performs the techniques described herein, and in doing so identifies sectors 77A, 77B as high scoring sectors. Accordingly, sectors 77A, 77B and divided into smaller sectors, i.e., sub-sectors. PDE 16 then identifies sub-sectors 78A, 78B as high scoring sectors and divides sub-sectors 78A, 78B into smaller sectors, i.e., sub-sub-sectors. PDE 16 then identifies sub-sub-sectors 79A, 79B as high scoring sectors and generates position assistance information based on the high scoring sub-sub-sectors 79A, 79B. Accordingly, the position assistance information sent to subscriber unit 10 is based on two or more probable locations, e.g., locations associated with sub-sub-sectors 79A, 79B. This may be due to the presence of two base stations 75A, 75D that have the same PN offset. At a first timing offset associated with conceptual circles 72A–72D, the signals converge in sector 79A, as illustrated by the fact that circles 72A, 72B and 72C pass through sector 79A. At a second timing offset associated with conceptual circles 73A–73D, the signals converge in sector 79B, as illustrated by the fact that circles 72B, 72C and 72D pass through sector 79B. In order to ensure that subscriber unit 10 can identify its location, position assistance information is generated based on both probable locations. One of the two locations should be correct. For example, the position assistance information may be based on a large area that encompasses both of sectors 79A and 79B, or may be based on multiple small areas that individually encompass the areas associated with sectors 79A and 79B.

Figure 8:
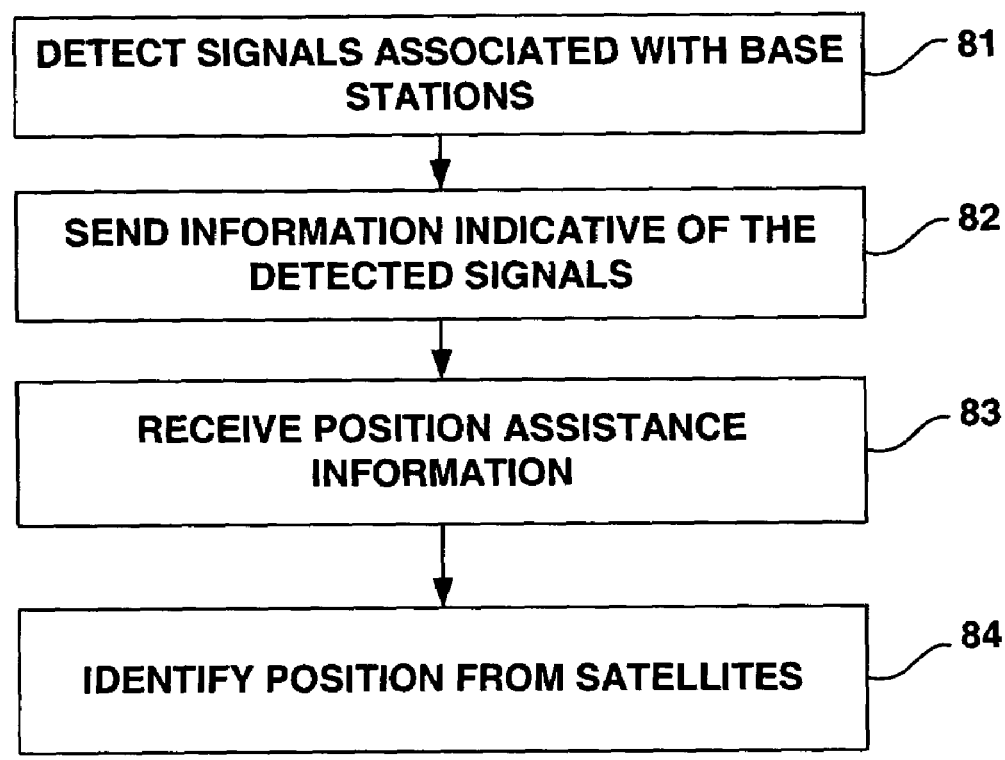
FIG. 8 is a flow diagram illustrating positioning techniques from the perspective of subscriber unit.

FIG. 8 is a flow diagram illustrating positioning techniques from the perspective of subscriber unit 10. As shown in FIG. 8, subscriber unit 10 detects signals associated with base stations 12 (81). For example, the signals may come directly from base stations 12, or via a repeater 14. Subscriber unit 10 sends information to PDE 16 indicative of the detected signals (82). For example, subscriber unit 10 may send to PDE 16 the measured PN offsets of the pilot symbols sent from base stations 12. In particular, subscriber unit 10 sends this information to PDE 16 through base station 12D.

After PDE 16 generates position assistance information, as outlined above, subscriber unit 10 receives the position assistance information (83). In accordance with this disclosure, the position assistance information may be based on two or more probable locations of the subscriber unit 10. In some cases, the position assistance information may identify the two or more probable locations of the subscriber unit, and in other cases, the position assistance information may identify satellites that were identified based on the two or more probable locations. In any case, subscriber unit 10 uses the position assistance information in identifying its position from satellites 5, e.g., via triangulation. The position assistance information can help accelerate the triangulation by reducing the time it takes to identify satellites 5 that are within view to subscriber unit 10.

The techniques described herein may be implemented in a subscriber unit or PDE in hardware, software, firmware, or the like. Example hardware implementations include implementations within a digital signal processor (DSP), an application specific integrated circuit (ASIC), a field programmable gate array (FPGA), a programmable logic device, specifically designed hardware components, or any combination thereof. In addition, one or more of the techniques described herein may be partially or wholly executed in software. In that case, a computer-readable medium may store or otherwise comprise computer-readable instructions, i.e., program code, that can be executed by a processor or DSP of a subscriber unit or PDE to carry out one of more of the techniques described above.

For example, the computer-readable medium may comprise random access memory (RAM), read-only memory (ROM), non-volatile random access memory (NVRAM), electrically erasable programmable read-only memory (EEPROM), flash memory, or the like. The computer-readable medium can be coupled to control unit 28 of subscriber unit 10, or coupled to processor 36 of PDE 16. In those cases, control unit 28 or processor 36 may comprise a processor or DSP that executes various software modules stored in the computer-readable medium.

Numerous other modifications may be made without departing from the spirit and scope of this disclosure. For example, although many of the techniques have been described in the context of CDMA systems, the techniques may also be applicable to other systems such as time division multiple access (TDMA) systems, frequency division multiple access (FDMA) systems, systems such as the global system for mobile communication (GSM) that use combinations of TDMA and FDMA techniques, or the like. Also, although many aspects of this disclosure have been described as a three-dimensional problem, solving for latitude, longitude and timing error, it may be desirable to adjust the techniques to account for a fourth dimension, i.e., altitude. For example, the signals of the base stations may be represented by spheres instead of circles in order to account for altitude. These and other embodiments are within the scope of the following claims.

The invention claimed is:

1. A method comprising:
   receiving information from a subscriber unit of a wireless communication system, the information being indicative of signals detected by the subscriber unit in the wireless communication system;
   dividing an area where the subscriber unit is suspected to be into a plurality of sectors;
   scoring the sectors based on the information, wherein a score for a respective sector indicates a likelihood that the subscriber unit is in the respective sector; and
   determining position assistance information based on the score for the respective sectors, for determining a position of the subscriber unit.

2. The method of claim 1, further comprising scoring the sectors based on the information for each of a plurality of timing errors hypothesized for the subscriber unit.

3. The method of claim 1, further comprising:
   identifying a subset of the sectors that have high scores; and
   sending position assistance information to the subscriber unit based on the subset of the sectors.

4. The method of claim 3, wherein the position assistance information identifies a set of global positioning system (GPS) satellites.

5. The method of claim 1, further comprising:
   identifying a subset of the sectors that have high scores;
   dividing each sector of the subset of sectors that have high scores into sub-sectors; and
   scoring the sub-sectors based on the information, wherein a score for a given sub-sector indicates a likelihood that the subscriber is in the given sub-sector.

6. The method of claim 5, further comprising:
   identifying a subset of the sub-sectors that have high scores; and
   sending position assistance information to the subscriber unit based on the subset of the sub-sectors.

7. The method of claim 5, further comprising:
   identifying a subset of the sub-sectors that have high scores;
   dividing each sub-sector of the subset of sub-sectors into sub-sub-sectors;
   scoring the sub-sub-sectors;
   identifying a subset of the sub-sub-sectors that have high scores; and sending position assistance information to the subscriber unit based on the subset of the sub-sub-sectors.

8. The method of claim 1, wherein the information includes phase offsets relative to system time, determined front the signals detected by the subscriber unit.

9. The method of claim 1, further comprising:
identifying a first subset of the sectors that have high scores;
identifying a second subset of the sectors by removing one or more sectors from the first subset based on a determination that the one or more sectors correspond to a location of a repeater in the wireless communication system; and
sending position assistance information to the subscriber unit based on the second subset of the sectors.

10. The method of claim 1, wherein scoring the sectors includes increasing a given score of a given sector when one or more detected signals correlate with expected signals of one or more base stations in proximity to the given sector.

11. The method of claim 1, wherein scoring the sectors includes modifying a given score of a given sector when a repeater is associated with the given sector.

12. A method comprising:
receiving information from a subscriber unit of a wireless communication system, the information being indicative of signals detected by the subscriber unit in the wireless communication system;
identifying two or more probable locations of the subscriber unit based on the information;
scoring the two or more probable locations of the subscriber unit based on the information; and
sending position assistance information to the subscriber unit based on the score of the two or more probable locations.

13. The method of claim 12, wherein the position assistance information identifies a set of global positioning system (GPS) satellites.

14. A method comprising:
detecting signals associated with base stations of a wireless communication system;
sending information from a subscriber unit, the information being indicative of the detected signals;
receiving position assistance information that identifies two or more probable locations of the subscriber unit; and
using the position assistance information to determine a location of the subscriber unit,
wherein the step of using provides the location of the subscriber unit in a reduced time period relative to a time period required to determine the location independently of the position assistance information.

15. The method of claim 14, wherein the position assistance information identifies a set of global positioning system (GPS) satellites.

16. The method of claim 15, further comprising identifying a position of the subscriber unit using signals from one or more satellites in the set of GPS satellites.

17. A computer-readable medium comprising computer-readable instructions that when executed in a position determination entity (PDE) cause the PDE to:
divide an area where a subscriber unit of a wireless communication system is suspected to be into a plurality of sectors;
score the sectors based on information received from the subscriber unit, the information being indicative of signals detected by the subscriber unit in the wireless communication system, wherein a score for a respective sector indicates a likelihood that the subscriber is in the respective sector; and
determine position assistance information based on the score for the respective sectors, the position assistance information capable of being used to determine a position of the subscriber unit.

18. The computer-readable medium of claim 17, further comprising instructions that cause the PDE to score the sectors based on the information for each of a plurality of timing errors hypothesized for the subscriber unit.

19. The computer-readable medium of claim 17, further comprising instructions that cause the PDE to:
identify a subset of the sectors that have high scores; and
send position assistance information to the subscriber unit based on the subset of the sectors.

20. The computer-readable medium of claim 17, further comprising instructions that cause the PDE to:
identify a subset of the sectors that have high scores;
divide each sector of the subset of sectors that have high scores into sub-sectors; and
score the sub-sectors based on the information, wherein a score for a given sub-sector indicates a likelihood that the subscriber is in the given sub-sector.

21. The computer-readable medium of claim 20, further comprising instructions that cause the PDE to:
identify a subset of the sub-sectors that have high scores; and
send position assistance information to the subscriber unit based on the subset of the sub-sectors.

22. The computer-readable medium of claim 20, further comprising instructions that cause the PDE to:
identify a subset of the sub-sectors that have high scores;
divide each sub-sector of the subset of sub-sectors into sub-sub-sectors;
score the sub-sub-sectors;
identify a subset of the sub-sub-sectors that have high scores; and
send position assistance information to the subscriber unit based on the subset of the sub-sub-sectors.

23. The computer-readable medium of claim 17, further comprising instructions to cause the PDE to increase a given score of a given sector when one or more detected signals correlate with one or more base stations in proximity to the given sector.

24. The computer-readable medium of claim 17, further comprising instructions to cause the PDE to modify a given score of a given sector when a repeater is associated with the given sector.

25. A position determination entity (PDE) of a wireless communication system, the PDE comprising:
a receiver to receive information from a subscriber unit of the wireless communication system, the information being indicative of signals detected by the subscriber unit in the wireless communication system; and
a processor to divide an area where the subscriber unit is suspected to be into a plurality of sectors, score the sectors based on the information, and determine position assistance information based on the scores, wherein a score for a respective sector indicates a likelihood that the subscriber is in the respective sector and the position assistance information is capable of being used by the subscriber unit to determine a position of the subscriber unit.

26. The PDE of claim 25, wherein the processor scores the sectors based on the information for each of a plurality of timing errors hypothesized for the subscriber unit.

27. The PDE of claim 25, wherein the processor identifies a subset of the sectors that have high scores, the PDE further comprising a transmitter to send position assistance information to the subscriber unit based on the subset of the sectors.

28. The PDE of claim 25, wherein the processor identifies a subset of the sectors that have high scores, divides each sector of the subset of sectors that have high scores into sub-sectors, and scores the sub-sectors based on the information, wherein a score for a given sub-sector indicates a likelihood that the subscriber is in the given sub-sector.

29. The PDE of claim 28, wherein the processor identifies a subset of the sub-sectors that have high scores, the PDE further comprising a transmitter to send position assistance information to the subscriber unit based on the subset of the sub-sectors.

30. The PDE of claim 28, wherein the processor identifies a subset of the sub-sectors that have high scores, divides each sub-sector of the subset of sub-sectors into sub-sub-sectors, scores the sub-sub-sectors and identifies a subset of the sub-sub-sectors that have high scores, the PDE further comprising a transmitter to send position assistance information to the subscriber unit based on the subset of the sub-sub-sectors.

31. The PDE of claim 25, wherein the information includes phase offsets relative to system time, determined from the signals detected by the subscriber unit.

32. The PDE of claim 25, wherein the processor identifies a first subset of the sectors that have high scores, and identifies a second subset of the sectors by removing one or more sectors from the first subset based on a determination that the one or more sectors are a location of a repeater in the wireless communication system.

33. The PDE of claim 25, wherein the processor scores the sectors by increasing a given score of a given sector when one or more detected signals correlate with one or more base stations in proximity to the given sector.

34. The PDE of claim 25, wherein the processor scores the sectors by modifying a given score of a given sector when a repeater is associated with the given sector.

35. An apparatus comprising:
 means for receiving information from a subscriber unit of a wireless communication system, the information being indicative of signals detected by the subscriber unit in the wireless communication system;
 means for dividing an area where the subscriber unit is suspected to be into a plurality of sectors;
 means for scoring the sectors based on the information, wherein a score for a respective sector indicates a likelihood that the subscriber is in the respective sector; and
 means for determining position assistance information based on the scores, the position assistance information capable of being used by a subscriber unit to determine a location of the subscriber unit.

36. The apparatus of claim 35, further comprising means for scoring the sectors based on the information for each of a plurality of timing errors hypothesized for the subscriber unit.

* * * * *